APPARATUS FOR GROWING COMPOUND SEMICONDUCTOR CRYSTAL

Filed April 13, 1960 2 Sheets-Sheet 1

INVENTOR

Morton E. Jones

BY Stevens, Davis, Miller & Mosher

ATTORNEYS

INVENTOR
Morton E. Jones
BY Stevens, Davis, Miller & Mosher
ATTORNEYS

United States Patent Office 3,154,384
Patented Oct. 27, 1964

3,154,384

APPARATUS FOR GROWING COMPOUND SEMICONDUCTOR CRYSTAL

Morton E. Jones, Richardson, Tex., assignor to Texas Instruments Incorporated, Dallas, Tex., a corporation of Delaware Filed Apr. 13, 1960, Ser. No. 21,997
8 Claims. (Cl. 23—273)

This invention relates to apparatus for growing crystals from melts, and particularly to a method and apparatus for growing compound semiconductor crystals which comprise at least two elements, one more volatile than all of the others. The binary compound semiconductors could consist of one element selected from each group of the following group pairs: Group II and Group VI, Group IV and Group VI, or Group III and Group V (the groups referring to groupings of the periodic tables according to Mendelejeff, as commonly displayed). The ternary compound semiconductors could be selected from the series of element groupings, such as Groups I–III–VI, Groups I–V–VI, and Groups II–IV–VI. Exemplary of two- and three-element compound semiconductors are InSb, InP, GaAs, AlP, PbTe, InSe, $In_2Te_3$, $AgSbTe_2$, $Bi_2Te_3$, $CuFeTe_2$, $CuGaSe_2$, and $CuFeSe_2$.

Inasmuch as the Group III–V compound semiconductor materials are well known and have been disclosed in U.S. Patent No. 2,798,989 to H. Welker, they will be utilized throughout this application to disclose the present invention. One of the most interesting and useful Group III–V compound semiconductor materials is gallium arsenide, and since the present invention is particularly useful in growing gallium arsenide crystals from a melt, it will also be used to disclose the present invention.

The discovery of these "III–V" semiconductor materials for the manufacture of crystals to be used in various electronic devices, such as transistors, has opened many new possibilities in the electronic field, but at the same time has created many new problems. Conventional crystal-pulling processes have heretofore utilized an enclosed chamber wherein the crystal melt was maintained, either in a vacuum or in an inert atmosphere, such as argon. It has been found that these conventional processes are not satisfactory when growing a crystal from the "III–V" melts when one of the elements, particularly the Group V element, has a comparatively high volatility. Such is the case when growing a crystal from a melt comprising gallium and arsenic; arsenic has a high volatility at the operating temperatures. In practice, it has been found that the vapor pressure of arsenic over the melt at the melting point of the compound is about 0.9 atmosphere. It is obvious that prior techniques of sending an inert gas into the chamber above the melt would not be satisfactory since the sublimed arsenic would be lost to the atmosphere. Consequently, growing a gallium arsenide crystal has been accomplished in a completely sealed chamber using magnetic coupling of the pull rod to the power drive to avoid risking breaking the seal of the chamber. Whereas this approach is successful from the standpoint of growing a crystal, nevertheless, it is exceedingly difficult to control or operate because of the magnetic coupling. Any attempt to establish a direct drive for the pull rod has met with utter failure, since either air leaked into the system via the drive and destroyed the process, or arsenic leaked out of the system via the drive. The corrosive nature of arsenic also is a serious problem as it fouls the drive and its seal at the point of entry into the system. As a result, it was believed that the only successful solution, regardless of the manipulative problems involved and the difficulty of control, was magnetic coupling.

Despite the recognized and admitted difficulties and problems involved in raising the crystal from the melt, intensive study and research has finally borne fruit; an apparatus has been evolved whereby a direct drive between pull rod and power drive can be used, overcoming all the disadvantages of magnetic coupling. This advance is the art has been accomplished through the discovery of a novel concept—a porous bearing and seal. Through this means it has been possible to solve the most difficult and troublesome problem that has prevented directly driving the pull rod. Essentially, the apparatus consists of a pull rod having a bearing and seal composed of a graphite bushing. The latter element is porous, and will tend to leak. To offset this, the bearing is backed by a cold trap. The tendency to leak, however, is more than compensated for by the ability of graphite to be operable at temperatures over 600° C., and most important, its facility to abrade away when deposited arsenic tends to foul the pull rod.

Accordingly, it is the object of this invention to provide an apparatus to overcome the problems and difficulties of the prior art when working with compound semiconductor melts wherein one element is particularly volatile, such as is the case with arsenic in making gallium arsenide crystals.

It is a further object of this invention to provide a and for conveniently limiting the loss of the volatile comunique apparatus for obtaining a directly driven pull rod ponents from the melt so that crystals of the desired composition may be pulled.

Further objects of the present invention include a novel crystal puller suitable for growing crystals as above described characterized by novel sealing arrangements, planned leaks, material traps, a novel graphite-to-quartz bearing, and a pull mechanism directly coupled to a quartz pull rod.

Broadly, the present invention comprises an apparatus for growing a crystal of such material as gallium arsenide wherein an ambient of arsenic is maintained above the melt and throughout the chamber surrounding said melt. This is accomplished by providing an excess of arsenic within the chamber, and heating the chamber to a temperature at which the arsenic sublimes, creating an arsenic ambient. Care must be taken that all portions of the chamber which are in contact with the arsenic ambient be maintained at sufficiently elevated temperatures to prevent collection of solid arsenic on the walls of said chamber.

A further feature of the invention is the unique way in which the correct equilibrium pressure of arsenic is established in the crystal puller without air leaking in to destroy the process or excessive arsenic leaking out. This is achieved by initially placing an excess of elemental arsenic in the bottom of the crystal pulling chamber. Upon heating, the arsenic sublimes into the initial inert gas atmosphere in the chamber, the total internal pressure rises above atmospheric, and the inert gas is gradually forced out through a controlled leak. As this process proceeds, the internal ambient becomes richer in arsenic (essentially the subliming arsenic tends to flush out the original inert gas) until such time as all of the excess arsenic sublimes and the pressure in excess of atmospheric has been eliminated by means of the leak. After this occurs, any further loss of arsenic is by the relatively slow diffusion process through the leak and, in practice, a satisfactory arsenic ambient may be maintained for the time required to grow a crystal. The problem of air getting into the system or the danger of arsenic being released to the atmosphere is eliminated by means of the technique described above.

The details of this invention and the preferred form thereof will appear more clearly from the following description and from the appended drawings, in which.

Figures 1, 2:
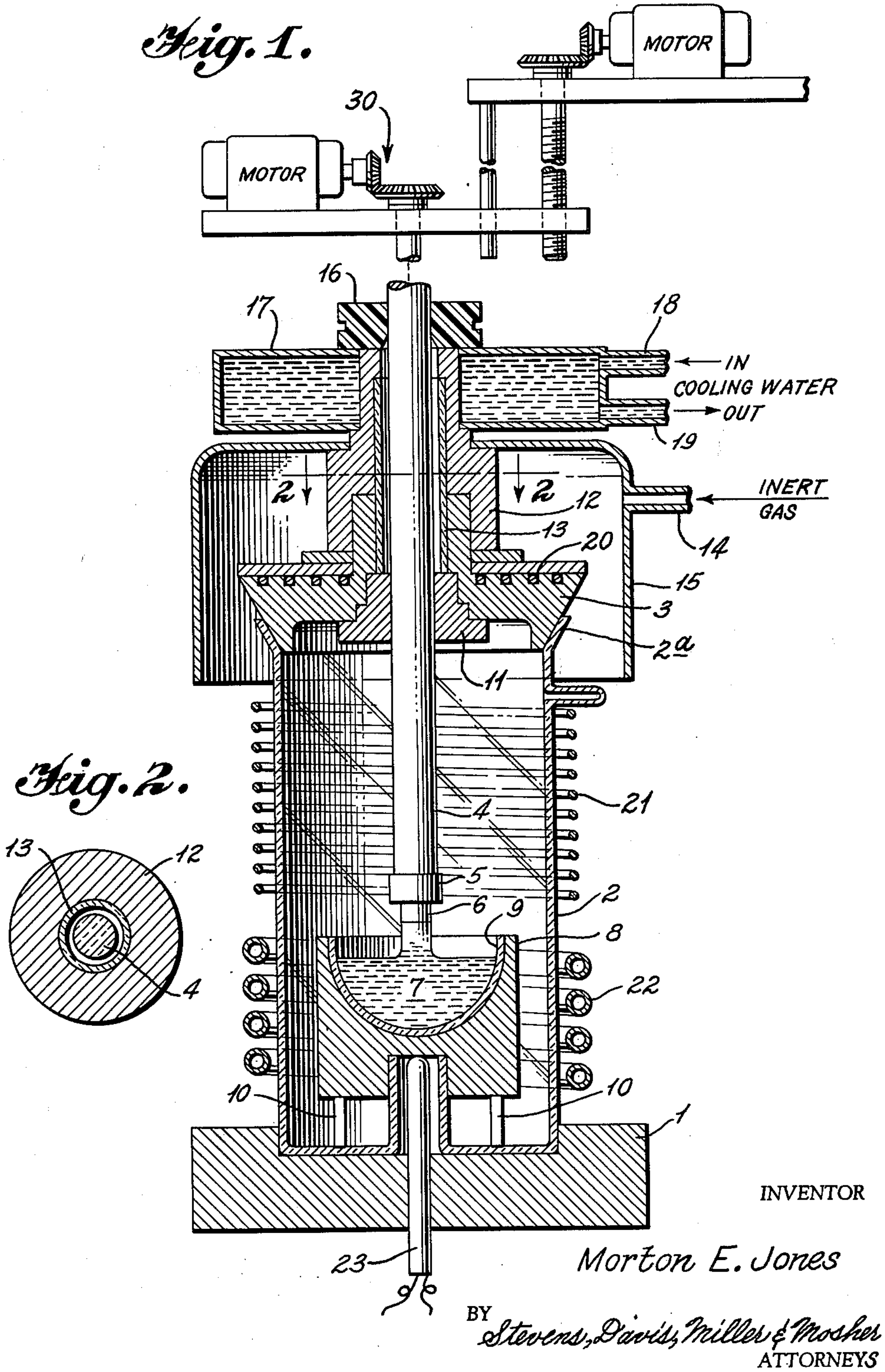
FIGURE 1 is a vertical view of a novel crystal pulling apparatus adapted for the practice of this invention, certain parts being shown in section for better illustration.
FIGURE 2 is a section of FIGURE 1 taken along line 2—2.

Referring now to FIGURE 1, the apparatus illustrated comprises a base 1 upon which is mounted a quartz tube 2 terminating at its top in a tapered portion 2*a*. The top of quartz tube 2 can be a flat ground seal rather than tapered. A sealing cap 3, preferably of boron nitride, covers the quartz tube. A quartz drive rod 4 connected to rotating and lifting apparatus, designated generally by the reference numeral 30, extends through sealing cap 3 down into the quartz tube 2 and terminates in chuck 5 to which is attached a crystal seed 6. Graphite crucible 8, having a quartz liner 9, contains the charge 7 which is to be melted. As in the usual pulling processes, a seed of semiconductor material of like composition to the melt is lowered into the melt and slowly withdrawn and rotated. When the temperature and pull rate are properly chosen, the melt will crystallize onto the seed to form a single large crystal. The crucible 8 is shown supported within the quartz tube by support 10.

Looking now at the upper part of the drawing, it will be seen that the rod 4 passes through graphite bearing 11 centered in boron nitride sealing cap 3. A boron nitride sleeve 12 extends upwardly from the cap 3. A quartz tube 13 fits within sleeve 12 and lies spaced from rod 4. The space defined between tube 13 and rod 4 serves as an arsenic trap. Around the area at the upper portion of the drive rod 4 is a water-cooled jacket 17 provided with inlet 18 and outlet 19 for cold water. Above this, a second seal 16, preferably of Teflon, is provided. Insulation cover 15 having an inlet work port 14 serves to maintain an inert gas atmosphere around sealing cap 3 and tapered portion 2*a*. Resistance heater 20 is located within seal 3, resistance heater 21 surrounds the middle of the chamber and R.F. coil 22 surrounds the melt. Thermocouple 23 is provided to maintain the melt at proper temperature.

The operation of the illustrated apparatus is as follows:

Originally, the chamber is cold and is flushed with an inert gas, for example argon, to provide an inert ambient. A quantity of gallium arsenide is placed in the crucible. A quantity of solid arsenic somewhat in excess of that required to give a pressure of one atmosphere when heated to 607° C. is placed in the bottom of the chamber. The chamber is then heated, whereupon the arsenic sublimes and flushes out the argon along with excess arsenic through the space between the boron nitride sealing cap 3 and the tapered portion 2*a*, the joint of which is purposely made less than gastight. An inert gas is maintained in cover 15 to prevent air from diffusing into the chamber. Any arsenic leaking through the bearing 11 condenses above the bearing in the cooler regions, particularly in the quartz arsenic trap 13. When all the arsenic has sublimed, and excess pressure has been relieved through the leaky taper, any further loss of arsenic will be by diffusion through the leaks. This is a relatively slow process, and in practice a satisfactory atmosphere may be maintained in the chamber for several hours. As pointed out above, all during the procedure just described and during the crystal pulling operation, the entire surface which is in contact with the arsenic ambient must be maintained at elevated temperatures (from about 607° C. to about 800° C.) to prevent collection of solid arsenic on the chamber walls. It is to be noted that special resistance heaters 20 and 21, judiciously arranged, have been provided for this explicit purpose.

Although the foregoing discussion and description has been specific to the problems occurring in pulling crystals of Group III–V compound semiconductor materials and in particular in obtaining gallium arsenide crystals, it should be appreciated that the techniques of this invention are in no way limited to these compound semiconductor materials.

The present invention is useful in pulling crystals of any compound semiconductor material if the compound contains an element more volatile than the others which has a vapor pressure of one atmosphere or less at the melting point of the compound melt from which a crystal is being pulled.

In Group III–V, compounds such as InAs and AlAs, as well as InP and GaP, when they exhibit vapor pressures of one atmosphere or less may be prepared by the technique of this invention. In some cases, it may be necessary that the compound be a metal-rich melt, which is often the case with phosphorus compounds, before it will exhibit vapor pressure of one atmosphere or less.

Many other binary and ternary compound semiconductor crystals may be prepared by the technique of this invention. Such compound semiconductor materials may be those containing an element from each group in the series of element groupings II–IV, IV–VI, I–III–VI, II–IV–VI, and I–V–VI. Moreover, it should be appreciated that any of the above enumerated compound semiconductor materials may contain various elements in trace impurity or "doping" quantities, as is well known in the art.

Figure 3:
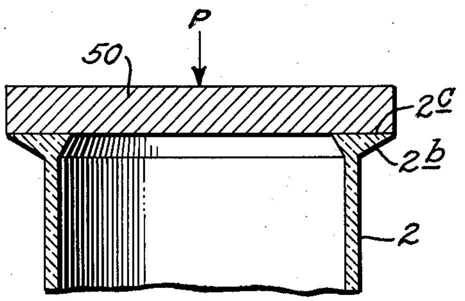
FIGURE 3 is a sectional detail view showing a top cap sealing arrangement for the crystal puller.
Figure 4:
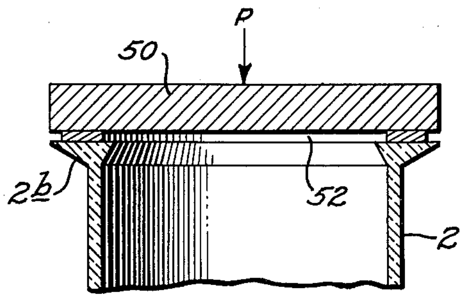
FIGURE 4 is a sectional detail view similar to that shown in FIGURE 3 showing an alternative sealing arrangement.
Figure 5:
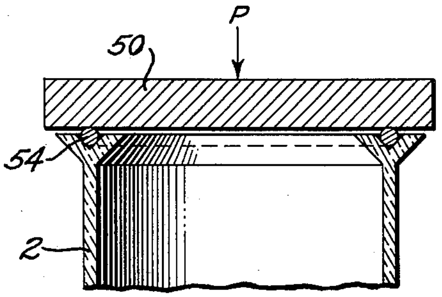
FIGURE 5 is a sectional detail view similar to that shown in FIGURES 3 and 4 showing a further sealing arrangement.

FIGURES 3, 4 and 5 illustrate gastight sealing arrangements for the top of a closed system crystal puller, useful in place of top sealing cap 3 and tapered section 2*a*. In this type crystal puller, it is extremely important that the seal be gastight. If air gets into the system, it will destroy the process. For convenience, top sealing cap 50 and top of quartz tube 2 are illustrated only, the pull rod, bearings, traps, heaters, etc., being omitted for sake of simplicity.

In FIGURE 3, the top edge of tube 2 is flanged at 2*b* and the top surface 2*c* is ground optically flat. When cap 50 of quartz or boron nitride is pressed against the top of tube 2 at surface 2*c*, a seal will result.

In FIGURE 4, the top 2*b* of tube 2 is likewise flanged and a washer 52, of soft malleable material having a melting point above 607° C., is positioned on the rim of tube 2. Cap 50 is pressed into contact with the washer to produce a seal. FIGURE 5 is similar to FIGURE 4, and shows the top of tube 2 as grooved (V shape). An O-ring 54 of soft malleable material, melting above 607° C., is located in the groove, and cap 50 presses against the top of tube 2 to form a seal. Washer 52 and ring 54 may be composed of gold, silver, or platinum or alloys thereof.

Figure 6:
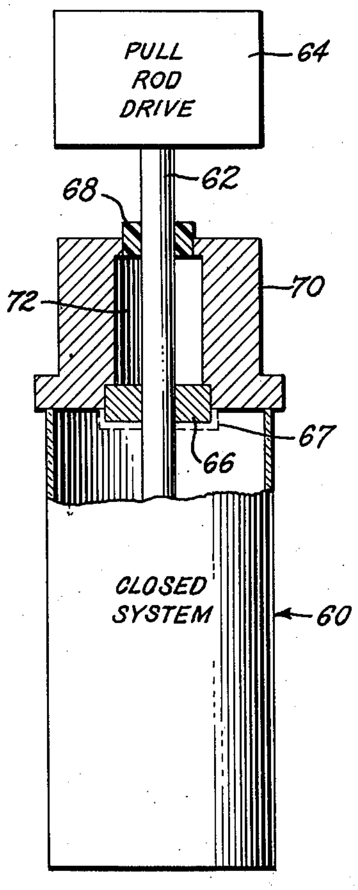
FIGURE 6 schematically illustrates a closed system pulling arrangement.

The sealing arrangements of FIGURES 3 to 5 can be used in the puller described in conjunction with FIGURE 1, the puller to be described in conjunction with FIGURE 6, or other system.

FIGURE 6 illustrates schematically a novel puller arrangement including a closed system crystal puller identified generally by the reference numeral 60, a quartz (noncontaminating) pull rod 62 extending into the system, a pull mechanism or drive 64 directly coupled to the pull rod 62 and a trap-seal consisting of a graphite bushing 66, a gastight seal 68, such as Teflon, and structural means 70 to define with the rod 62 and bushing 66 and seal 68 a trap or chamber 72.

If the system of FIGURE 6 is used employing a gastight graphite bushing 66 and an arsenic vapor pressure control chamber is interconnected to the closed system, then the trap 72 can be eliminated. The graphite bushing 66 may be made gastight by applying a seal coating 67 (illustrated in dotted lines) where it is exposed to the closed system 60 ambient. For example, a nonporous carbon coating can be used for this purpose. Graphite is the preferred material for bushing 66, since it is self-lubricating, is operable at temperatures above 600° C., and is soft enough to abrade away and protect the quartz pull rod from soil arsenic. This last feature is important, since arsenic will deposit on the bushing, and would cause severe damage to the pull rod were the bushing not possessed of this property.

There has been described an apparatus suitable for growing compound semiconductor crystals according to the present invention. However, it is apparent that further modifications and changes may be made in this apparatus without departing from the scope of inventions as disclosed herein. It is the intent to claim all such modifications and changes as are within the scope of the appended claims.

What is claimed is:

1. A crystal pulling apparatus for making a compound semiconductor crystal selected from the group consisting of the series of element groupings, according to the periodic table of elements, II–VI, IV–VI, I–III–VI, II–IV–VI, I–V–VI, III–V, and III–VI, comprising a chamber, a crucible supported within said chamber for containing a melt therewithin including elements for making said compound semiconductor crystal, one of said elements in said melt possessing a volatility in excess of the others and exhibiting a vapor pressure over the melt not in excess of one atmosphere at the melting point of said melt from which said compound semiconductor crystal is being pulled, means for heating said melt and said chamber to volatilize said one of said elements and establish an ambient in said chamber which ambient includes said one of said elements and for maintaining all the parts of said chamber which contact the ambient above the crucible at a temperature sufficiently high to prevent solidifying of the vapor on said parts, means extending into said chamber for pulling said semiconductor crystal from said melt, and said chamber including means through which said pull means extends for permitting an amount of the ambient within said chamber to leak from said chamber and relieve the pressure therein during heating of said melt, and means providing a condensation type gas trap surrounding said pull means exteriorly of said chamber to trap gas escaping via said leak means.

2. An apparatus for pulling a crystal from a melt, comprising a chamber, a crucible for containing said melt, said crucible being supported within said chamber, means for heating said melt and said chamber throughout the area thereof, means extending into said chamber for pulling a crystal from said melt, and said chamber including means for substantially sealing said chamber and for permitting leakage of gas from said chamber during heating and crystal pulling, and said sealing means including a porous bushing which permits leakage of gas therethrough and through which said crystal pulling means extends into said chamber, and means providing a condensation type gas trap surrounding said pull means exteriorly of said chamber to trap gas escaping via said porous bushing.

3. An apparatus for pulling a crystal from a melt, compisring a chamber, a crucible for containing said melt, said crucible being supported within said chamber, means for heating said melt and said chamber throughout, said chamber comprising an open upper portion having a tapered upper face, means engaging and substantially sealing said face and for permitting leakage of gas from said chamber through the sealing joint at said face, and pull rod means extending through said last-mentioned means and into said chamber for pulling a crystal from said melt.

4. An apparatus for pulling a crystal from a melt, comprising a chamber, a crucible for containing said melt, said crucible being supported within said chamber, heating means for heating said melt and for heating said chamber throughout, said chamber comprising an open upper portion having a tapered upper face, sealing means engaging and substantially sealing said tapered face and for permitting leakage of gas from said chamber through the sealing joint at said face, pulling means extending through said sealing means and into said chamber for pulling a crystal from said melt, and at least part of said heating means being incorpoarted in said sealing means.

5. An apparatus for pulling a crystal from a melt, comprising a chamber, a crucible for containing said melt, said crucible being supported within said chamber, means for heating said chamber and said melt, a noncontaminating pull rod extending into said chamber, sealing means for said chamber including a porous bushing which permits leakage of gas therethrough supporting said pull rod at its point of entry into said chamber, a pull mechanism directly coupled to said pull rod, and means providing a condensation type gas trap surrounding said pull rod exteriorly of said chamber to trap gas escaping via said porous bushing.

6. Apparatus for growing compound semiconductor crystals by the pulling technique comprising a chamber having an open end; a crucible for containing a melt supported and disposed within said chamber; means sealing the open end of said chamber including a porous graphite bushing which permits leakage of gas therethrough and through which a pull rod extends into said chamber; a pull mechanism directly coupled to said pull rod exteriorly of said chamber, and means providing a condensation type gas trap surrounding a portion of said pull rod exteriorly of said chamber to trap gas escaping out of said chamber via said porous bushing.

7. Apparatus for growing compound semiconductor crystals by the pulling technique in the presence of an ambient containing a volatile element, comprising a chamber having an open end with a tapered upper face; a crucible for containing a melt supported and disposed within said chamber; means for heating said melt and for heating said chamber throughout, means substantially sealing the open end of said chamber having portions engaging said tapered face permitting leakage of gas therethrough from within said chamber to relieve excess gas pressure within said chamber, said sealing means also including a graphite porous bushing permitting leakage of gas therethrough and through which a noncontaminating pull rod extends into said chamber; a pull mechanism directly coupled to said pull rod exteriorly of said chamber, means providing a condensation type gas trap surrounding a portion of said pull rod exteriorly of said chamber to trap gas escaping out of said chamber through said porous bushing.

8. The apparatus as set forth in claim 7 and wherein said pull rod comprises quartz and said sealing means incorporates heating means therein for heating the surface of said sealing means in contact with said ambient to prevent the volatile element in said ambient from solidifying on said sealing means surfaces.

References Cited by the Examiner

UNITED STATES PATENTS

| | | | |
|---|---|---|---|
| 2,680,410 | 6/54 | Klob. | |
| 2,798,989 | 7/57 | Welker | 23—204 |
| 2,809,135 | 10/57 | Koury | 23—273 |
| 2,862,283 | 12/58 | Rasero. | |
| 2,890,139 | 6/59 | Schockley | 23—273 |
| 3,031,403 | 4/62 | Bennett | 252—62.3 |

FOREIGN PATENTS

| | | |
|---|---|---|
| 1,152,250 | 2/58 | France. |

OTHER REFERENCES

Review of Scientific Instruments, volume 24, number 8, August 1958, pages 652–655 by Lehovec et al.

Semiconductors by Hannay, Feb. 27, 1959, Reinhold Corp., New York, N.Y., QC 611 H 32, pages 111 to 113 and 411 to 414.

NORMAN YUDKOFF, *Primary Examiner.*

GEORGE D. MITCHELL, HERBERT L. MARTIN, MAURICE A. BRINDISI, *Examiners.*